W. ADAMSON.
PROCESS OF EXTRACTING HYDROCARBONS FROM SUBSTANCES WHICH HAVE BEEN TREATED THEREWITH.
No. 191,633.  Patented June 5, 1877.
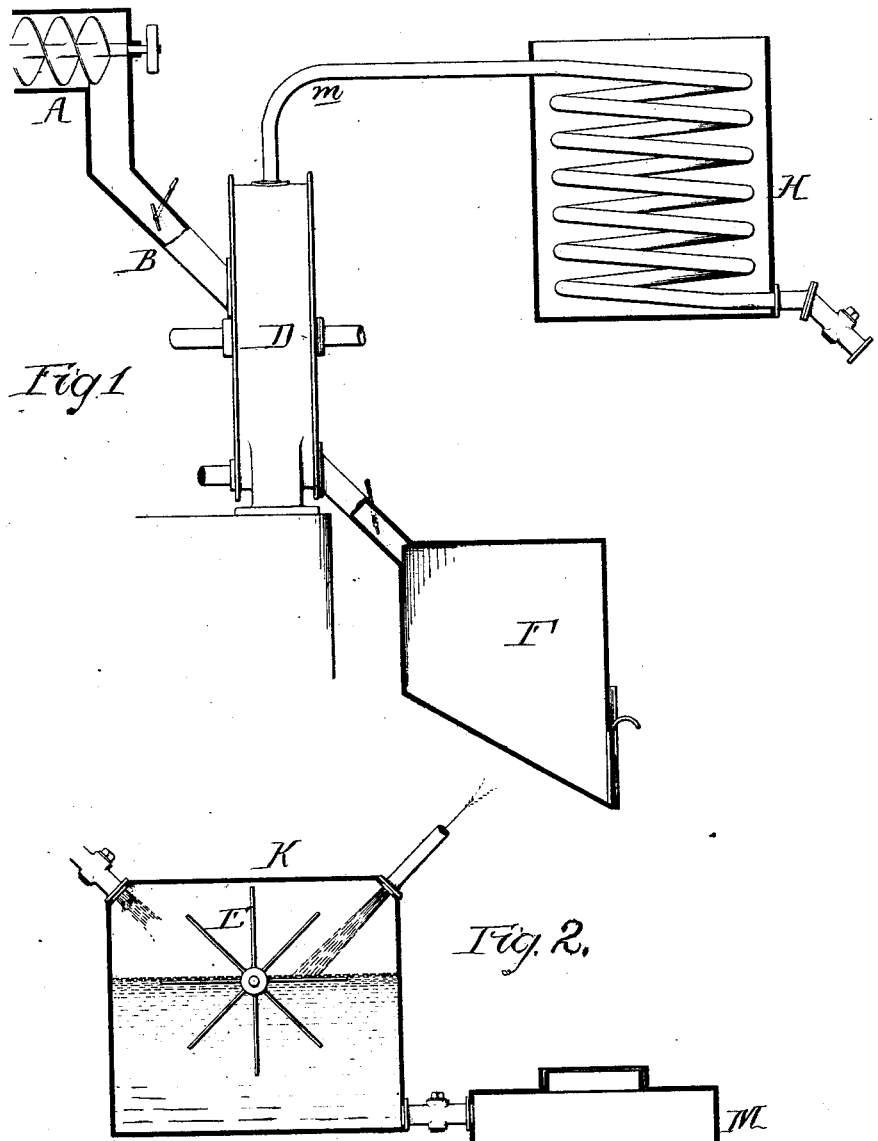

UNITED STATES PATENT OFFICE.

WILLIAM ADAMSON, OF PHILADELPHIA, PENNSYLVANIA.

IMPROVEMENT IN PROCESSES OF EXTRACTING HYDROCARBONS FROM SUBSTANCES WHICH HAVE BEEN TREATED THEREWITH.

Specification forming part of Letters Patent No. 191,633, dated June 5, 1877; application filed April 14, 1877.

*To all whom it may concern:*

Be it known that I, WILLIAM ADAMSON, of Philadelphia, Pennsylvania, have invented a new and useful Improvement in Extracting Hydrocarbon from Substances which have been Treated Therewith, of which the following is a specification:

The main object of my invention is to subject substances which have been treated with hydrocarbon, either in a liquid or vaporous condition, to such agitation, disintegration, and heat that the said substances will be effectually deprived of all traces of hydrocarbon.

The treatment of animal and vegetable matter with hydrocarbon vapor or liquid hydrocarbon, for the purpose of extracting oily and fatty matter therefrom, may be conducted in different kinds of apparatus. The plan shown in the Patent No. 184,815, granted to me November 28, 1876, may, for instance, be employed for the purpose.

In treating substances with hydrocarbon a portion of the latter gains access to a greater or less extent to the cells, from which the oils, fats, or moisture have been dislodged, and this causes such an impregnation or saturation of the substances treated, that there is difficulty in removing the hydrocarbon with which the substances have been treated.

When the vapor only of hydrocarbon is used, as in my aforesaid patent, there is not such a saturation of the substance as when liquid hydrocarbon is used; nevertheless it is important that all traces of the hydrocarbon should be rapidly and effectually removed, especially when the treated substances have to be used as food. The hydrocarbon, moreover, when permitted to remain in the substances treated, or when it is evaporated by exposure, is lost.

The object of my invention, which I will now particularly describe, has been to bring about this effectual removal of the hydrocarbon.

In the accompanying drawing, Figure 1 illustrates, partly in section, apparatus wherewith my invention may be carried into effect, A being the discharge-pipe of the apparatus described in my aforesaid Patent No. 184,815.

The substance which has been treated with hydrocarbon vapor passes from this discharge-pipe through a duct, B, into the disintegrating apparatus D.

Different kinds of disintegrating or separating devices may be used, but I prefer the well-known Carr disintegrator described and illustrated on page 1020 of Knight's Mechanical Dictionary.

The effect of this disintegration is to keep in a state of agitation, and finely separated, the friable substance, which in most cases is sufficiently hot to vaporize the hydrocarbon, which is exposed by the disintegration.

In some cases, however, as, for instance, when the substance is treated with liquid hydrocarbon, it may be necessary to apply sufficient heat to the disintegrator to insure a rapid vaporizing of the liquid hydrocarbon with which the substance is impregnated.

For this purpose there may be steam-coils within the casing of the disintegrator, or other means of heating the contents may be adopted.

The vapor passes off through the pipe $m$, which may be continued in the form of a worm in a condenser, H, the condensed vapor passing into a suitable receptacle preparatory to being used for the treatment of animal or vegetable substances, or, by preference, being admitted to the washing apparatus for which Letters Patent 183,098 were granted to me October 10, 1876, and which is shown in Fig. 2.

The partial vacuum made in the disintegrator aids in effecting the rapid vaporizing of the hydrocarbon as the heated particles are maintained in a state of agitation.

The condenser H may be dispensed with, and the vapor discharged into the vessel K, where it is met by a stream of cold water and condensed, the condensed vapor and water being agitated by a paddle-wheel, E, or other device, and the contents being discharged from time to time into a subsiding-vessel, M, wherein the hydrocarbon will take its place above the water, which has absorbed the fetid odors derived from the substance under treatment in the disintegrator, the foul water being drawn off from time to time, and the pure hydrocarbon being again used for the preliminary treatment of substances prior to the disintegration, as described.

While the condensed vapor may be at once used for treating substances, I prefer this washing operation, so that the fetid odors acquired by treating one mass may not be transmitted to another mass.

The disintegrated mass which accumulates in the vessel F and which is effectually deprived of the hydrocarbon with which it had been more or less impregnated, may be removed therefrom for application to such uses as its quality, animal or vegetable, may suggest.

The condensing and washing apparatus described in my Patent No. 183,097 may be employed in connection with the apparatus.

I claim as my invention—

The mode herein described of extracting hydrocarbon from substances treated therewith—that is to say, by subjecting the said substances to disintegration and heat simultaneously, substantially in the manner described.

In testimony whereof I have signed my name to this specification in the presence of two subscribing witnesses.

WILLIAM ADAMSON.

Witnesses:
HERMANN MOESSNER,
HARRY SMITH.